(12) United States Patent
Cao (10) Patent No.: US 10,015,731 B2
(45) Date of Patent: *Jul. 3, 2018

(54) NETWORK ACCESS METHOD AND MOBILE TERMINAL

(71) Applicant: Guangdong Oppo Mobile Telecommunications Corp., Ltd., Dongguan, Guangdong (CN)

(72) Inventor: Jun Cao, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,321

(22) Filed: Jul. 7, 2017

(65) Prior Publication Data

US 2017/0311237 A1 Oct. 26, 2017

Related U.S. Application Data

(63) Continuation-in-part of application No. PCT/CN2016/086235, filed on Jun. 17, 2016, and a
(Continued)

(30) Foreign Application Priority Data

Jun. 19, 2015 (CN) .......................... 2015 1 0346852

(51) Int. Cl.
*H04W 4/00* (2018.01)
*H04W 48/16* (2009.01)
(Continued)

(52) U.S. Cl.
CPC ........... *H04W 48/16* (2013.01); *H04W 8/183* (2013.01); *H04W 8/22* (2013.01); *H04W 8/26* (2013.01); *H04W 48/18* (2013.01)

(58) Field of Classification Search
CPC .............................. H04W 48/16; H04W 48/18
See application file for complete search history.

(56) References Cited

U.S. PATENT DOCUMENTS 8,219,065 B2 * 7/2012 Chen .................. H04W 12/06
455/411
9,344,877 B1 5/2016 Arugonda et al.
(Continued)

FOREIGN PATENT DOCUMENTS

| CN | 101031145 A | 9/2007 |
| CN | 101547499 A | 9/2009 |

(Continued)

OTHER PUBLICATIONS

Wei et al., "The MDT applicability of Equivalent PLMN identities", 3GPP TSG-RAN WG3 Meeting #73, Aug. 26, 2011.
(Continued)

*Primary Examiner* — Kevin C Harper
(74) *Attorney, Agent, or Firm* — Young Basile Hanlon & MacFarlane, P.C.

(57) ABSTRACT

A network access method includes the follows. Information of a target user identification card inserted into a mobile terminal is detected. Whether the target user identification card is included in at least one user identification card stored in advance by the mobile terminal is determined. If no, determine that the target user identification card is a new card inserted into the mobile terminal the first time and all the network types supported by the target user identification card according to a type of the target user identification card will be determined. Network identifiers of PLMNs of all the network types are determined and added to an EHPLMN list. If it finds a target PLMN that matches a network identifier in the EHPLMN list when the mobile terminal arrives at a place of visit from a designated location, a
(Continued)

communication connection between the mobile terminal and the target PLMN is established.

14 Claims, 5 Drawing Sheets

Related U.S. Application Data continuation of application No. 15/478,892, filed on Apr. 4, 2017.

(51) Int. Cl.
*H04W 8/18* (2009.01)
*H04W 8/22* (2009.01)
*H04W 48/18* (2009.01)
*H04W 8/26* (2009.01)

(56) References Cited

U.S. PATENT DOCUMENTS

| | | | | |
|---|---|---|---|---|
| 2008/0220773 A1* | 9/2008 | Buckley | ............. | H04W 48/18 455/433 |
| 2011/0086670 A1* | 4/2011 | Shin | ............. | H04W 8/205 455/558 |
| 2013/0059612 A1* | 3/2013 | Zhang | ............. | H04W 4/14 455/466 |
| 2014/0140326 A1* | 5/2014 | Zhang | ............. | H04W 36/36 370/331 |
| 2015/0282060 A1* | 10/2015 | Huang-Fu | ............. | H04W 8/205 455/435.2 |
| 2015/0296364 A1* | 10/2015 | Peruru | ............. | H04W 8/005 455/434 |
| 2015/0341840 A1* | 11/2015 | Lee | ............. | H04W 24/08 455/437 |

FOREIGN PATENT DOCUMENTS

| | | |
|---|---|---|
| CN | 101657005 A | 2/2010 |
| CN | 101742482 A | 6/2010 |
| CN | 102905346 A | 1/2013 |
| CN | 103068009 A | 4/2013 |
| CN | 103906180 A | 7/2014 |
| CN | 105050112 A | 11/2015 |
| CN | 105554726 A | 5/2016 |
| EP | 2312873 A2 | 4/2011 |
| EP | 3169109 A1 | 5/2017 |

OTHER PUBLICATIONS

"3rd Generation Partnership Project; Technical Specification Group Core Network and Terminals; Non-Access-Stratum (NAS) functions related to Mobile station (MS) in idle mode (Release 12)", 3GPP Standard; 3GPP TS 23.122, France, vol. CT WG1, No. V12.6.0, Mar. 19, 2015, pp. 1-46, XP050927767.
Extended European search report issued in corresponding European application No. 16811035.1 dated Apr. 10, 2018.

* cited by examiner

NETWORK ACCESS METHOD AND MOBILE TERMINAL

CROSS-REFERENCE TO RELATED APPLICATION(S)

This application is a continuation of U.S. application Ser. No. 15/478,892, filed on Apr. 4, 2017, which is a continuation-in-part of International Application No. PCT/CN2016/086235 filed on Jun. 17, 2016, which claims priority to Chinese Patent Application No. 201510346852.0, filed on Jun. 19, 2015, the contents of all of which are herein incorporated by reference in their entireties.

TECHNICAL FIELD

The present disclosure relates to the field of mobile communication, and particularly to a network access method and a mobile terminal.

BACKGROUND

Public Land Mobile Network (PLMN) is a network established and operated by governments and approved operators thereof for providing the public with land mobile communication business. The PLMN is generally interconnected with a public switched telephone network to form a communication network of the whole region or country.

Generally, the identity ("ID" for short) of the PLMN is a string of numbers, for example, the network identity of the PLMN of China Mobile is 46000, and the network identity of the PLMN of China Unicom is 46001. Users can communicate with each other conveniently and quickly via mobile networks provided by various operators. With an improvement of people's living standard, there are more and more users who carrying communication terminal equipment. When a user arrives at a visited place that is not the home of a card of a mobile terminal such as a mobile phone, or when a user with a mobile phone with a new card arrives at a visited place that is not the home of the new card, the mobile phone needs to search a network to obtain the network identity of the PLMN.

However, in the related art, when searching a network, the mobile phone needs to keep searching and attempts to connect to a searched network. The mobile phone cannot make network access until a network type supported by the mobile phone is found after continuous attempt and it takes a long time to connect to a network; a continuous network connection attempt of the mobile phone can result in large power consumption and poor user communication experience.

BRIEF DESCRIPTION OF THE DRAWINGS

In order to more clearly illustrate the technical solutions of the implementations of the present disclosure, the drawings used in the description of the implementations will be briefly described, it will be apparent that the drawings described in the following are implementations of the present disclosure, and it will be apparent to those skilled in the art that other drawings may be obtained from the drawings without any creative efforts.

DETAILED DESCRIPTION

Technical solutions of the present disclosure will be described clearly and completely with reference to the accompanying drawings; obviously, implementations described below are merely part of rather than all of the implementations of the present disclosure. Based on the implementations of the present disclosure, other implementations obtained therefrom without any creative work by those of ordinary skill in the art shall fall within the protection scope of the present disclosure.

Implementations of the present disclosure provide a network access method and a mobile terminal, which can reduce the length of time that the mobile terminal takes to connect to a Public Land Mobile Network (PLMN) and enhance user communication experience on the mobile terminal.

Basically, in implementations of the present disclosure, when accessing networks, a network identity (ID) of a target Public Land Mobile Network (PLMN) found during a network search is matched with network IDs in at least one predetermined list; and when the network ID of the target PLMN matches at least one network ID in the at least one predetermined list, a communication connection between the mobile terminal and the target PLMN can be established.

In one network access method of the implementation of the present disclosure, perform network ID match before network connection. If a target user identification card inserted into a mobile terminal is a new card which is inserted into the mobile phone for the first time, the network type supported by the target user identification card can be determined according to the type of the card; thereafter, the network ID of the PLMN of the network type can be determined according to the network type supported by the target user identification card, and the network ID of the PLMN of the network type can be added to an EHPLMN list based on which network ID match can be carried out. If the network ID match is successful, a network connection will be conducted.

According to an implementation of the present disclosure, there is provided a method of accessing a network.

Information of a target user identification card inserted into a mobile terminal is detected, and whether the target user identification card is included in at least one user identification card stored in advance by the mobile terminal is determined. If no, it is determined that the target user identification card is a new card inserted into the mobile terminal the first time, and all the network types supported by the target user identification card according to a type of the target user identification card will be determined. Network identifiers of public land mobile networks PLMNs of all the network types are determined according to the network types supported by the target user identification card, and the network identifiers of the PLMNs of all the network types are added to an equivalent home public land mobile network EHPLMN list. If it finds a target PLMN that matches a network identifier in the EHPLMN list when the mobile terminal arrives at a place of visit from a designated location and begins to search for networks, a communication connection is established between the mobile terminal and the target PLMN.

The process of detecting the information of the target user identification card inserted into the mobile terminal and determining whether the target user identification card is included in the at least one user identification card stored in advance by the mobile terminal include the follows. The information of the at least one user identification card stored in advance by the mobile terminal is acquired from a built-in storage space or a cloud storage space of the mobile terminal. It is determined whether the information of the target user identification card is that of one of the at least one user identification card pre-stored in the built-in storage space or the cloud storage space of the mobile terminal; if yes, it is determined that the target user identification card is included in the at least one user identification card pre-stored by the mobile terminal; if no, it is determined that the target user identification card is not included in the at least one user identification card pre-stored by the mobile terminal.

After adding the network identifiers of the PLMNs of all the network types to the EHPLMN, the method can further include the follows. The network identifiers of the PLMNs of all the network types are added to an equivalent public land mobile network (EPLMN) list for the mobile terminal to search for the networks; each of the network identifiers comprises a network number segment.

When the mobile terminal arrives at the place of visit from the designated location and begins to search for the networks, the mobile terminal matches the network identifiers of the searched networks with those in the EHPLMN list, in order to search for a target PLMN that matches a network identifier in the EHPLMN list; or the mobile terminal matches the network identifiers of the searched networks with those in the EPLMN list and in the EHPLMN list, in order to search for a target PLMN that matches a network identifier in the EPLMN list or in the EHPLMN list.

The method further includes the follows after establishing the communication connection between the mobile terminal and the target public land mobile network PLMN. A total length of time consumed by the mobile terminal is calculated to find the target PLMN and establish the communication connection with the target PLMN, and the total length of time is output as the time of the current network access to a user interface of the mobile terminal for view of the user of the mobile terminal.

According to another aspect of the present disclosure, there is provided a mobile terminal, which includes a detecting unit, a determining unit, an adding unit, and a connecting unit.

The detecting unit is configured to detect information of a target user identification card inserted into a mobile terminal, and determine whether the target user identification card is included in at least one user identification card stored in advance by the mobile terminal.

The determining unit is configured to determine that the target user identification card is a new card inserted into the mobile terminal the first time if the determination of the detecting unit is no, and determine all the network types supported by the target user identification card according to a type of the target user identification card.

The adding unit is configured to determine network identifiers of public land mobile networks PLMNs of all the network types according to the network types supported by the target user identification card that are determined by the determining unit, and add the network identifiers of the PLMNs of all the network types to an equivalent home public land mobile network EHPLMN list.

The connecting unit is configured to, if it finds a target PLMN that matches a network identifier in the EHPLMN list when the mobile terminal arrives at a place of visit from a designated location and begins to search for networks, establish a communication connection between the mobile terminal and the PLMN.

Figure 1:
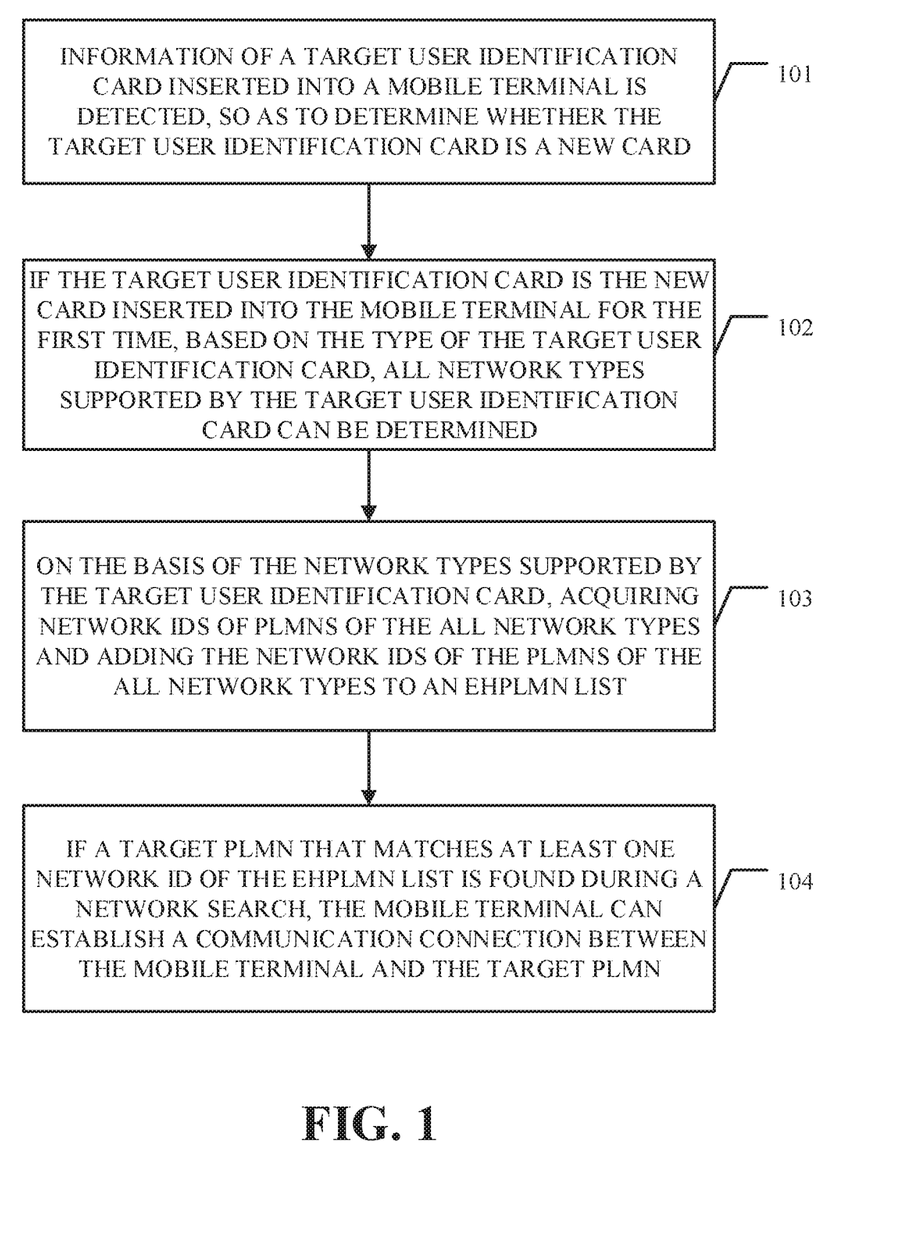
FIG. 1 is a flow diagram illustrating a network access method of an implementation of the present disclosure.

Please referring to FIG. 1, which is a flow diagram illustrating a network access method of an implementation of the present disclosure. The method illustrated in FIG. 1 is applicable to an intelligent mobile phone (such as Android® mobile phone, and the like) and other mobile terminals. As illustrated in FIG. 1, the network access method can begin at block 101.

At block 101, information of a target user identification card inserted into a mobile terminal is detected, so as to determine whether the target user identification card is a new card; in one implementation, so as to determine whether the target user identification card is included in at least one user identification card pre-stored by the mobile terminal.

In some implementations, take mobile phones as an example of the mobile terminal for explanation. The user identification card described in implementations of the present disclosure can be a subscriber identity module (SIM) card or a universal subscriber identity module (USIM) card of a mobile phone. The information of the user identification card includes the operator of the SIM card (For example, China Mobile, China Unicom, or China Telecom), network types supported by the SIM card (will be described in detail later), or the subscriber of the SIM card (that is, the user ID of the mobile phone user bonded with the SIM card).

During implementation, when the mobile phone user inserts a mobile phone SIM card into the card slot of the mobile phone, the mobile phone can first detect whether the SIM card (that is, target user identification card, or target SIM card) inserted into the card slot of the mobile phone is a new card.

Specifically, the mobile phone can detect the information of the target SIM card inserted into the mobile phone via a built-in card identification module, and match the information of the target SIM card with information of multiple SIM cards pre-stored by the mobile terminal so as to determine whether the target SIM card is one of the multiple SIM cards pre-stored by the mobile terminal. If the match is successful, it can be determined that the target SIM card is one of the multiple SIM cards pre-stored by the mobile terminal, that is, the target SIM card is a card that has been used on the mobile phone and is not a new card. If the match is un-successful, it can be determined that the target SIM card is not one of the multiple SIM cards pre-stored by the mobile terminal, that is, the target SIM card has not been used on the mobile phone and is a new card.

During implementation, the mobile phone can first obtains information of one or more SIM cards pre-stored by the mobile phone from a built-in storage space (including a mobile phone build-in memory or an expanded storage space such as a SD card of the mobile phone, and the like) or a cloud storage space of the mobile phone (in the following, can be collectively referred to as "storage space"), where the one or more SIM cards are SIM cards that have been used on the mobile phone, and the mobile phone can store information of each SIM card that has been used in the above mentioned storage space. After the pre-stored information of the one or more SIM cards has been obtained, the mobile phone can match information of the target SIM card with the pre-stored information of the multiple SIM cards so as to judge whether the information of the target SIM card is one of the pre-stored information of the multiple SIM cards of the mobile phone.

At block 102, if the target user identification card is the new card inserted into the mobile terminal for the first time, based on the type of the target user identification card, all network types supported by the target user identification card can be determined. In one implementation, if the target user identification card is not included in the at least one user identification card pre-stored by the mobile terminal, the target user identification card will be deemed as a new card.

In some implementations, if the information of the target SIM card is not one of the pre-stored information of the multiple SIM cards, the mobile phone can determine that the target SIM card is a new card, and prompt information that the target SIM card is a new card can be output to a user operation interface of the mobile phone such that users of the mobile phone can consult and determine whether the detection result is accurate. During implementation, if the detection result is accurate, the mobile phone can determine all network types supported by itself according to the type of the target SIM card, and can further establish a network search list corresponding to the target SIM card.

In some implementations, the network type described herein can include:

CDMA (Code Division Multiple Access) 1×, 800 MHZ frequency band assigned for mobile terminals in CDMA network standard; 900/1800/1900 MHZ frequency band assigned for mobile terminals in GSM (Global System for Mobile Communication) network standard, and 900/1800 MHZ frequency band assigned for GSM 1× dual-model (that is, WCDMA (Wideband Code Division Multiple Access)) in recent years; 900/1800/1900/2100 MHz frequency band assigned for terminals in 3G (the third generation) mobile communication technology network standard; and 1920-2170 MHZ frequency band assigned for terminals in 4G mobile communication technology network standard; however, the present disclosure is not limited thereto.

At block 103, on the basis of the network types supported by the target user identification card, network IDs of public land mobile networks (PLMN) of all the network types described above can be determined and then added to an equivalent home public land mobile network (EHPLMN) list.

In some implementations, after all network types supported by the SIM card of the mobile phone have been determined, based on all the network types, the mobile phone can determine network IDs of PLMNs of all the network types and add the network IDs of PLMNs of all the network types to the EHPLMN list. That is, in implementations of the present disclosure, the mobile phone can predetermine network IDs of PLMNs of multiple network types supported by the mobile phone, and add the network IDs of PLMNs of the multiple network types to the EHPLMN list as well as save the EHPLMN list to the storage space. The EHPLMN list can be used for network ID match when the mobile phone searching networks and the mobile phone can attempt to connect to a network after a corresponding network ID has been found; it is possible to reduce the length of time consumed for network search and improve the efficiency of network connection.

In some implementations, the EHPLMN described herein is an equivalent PLMN of a PLMN currently selected by the mobile phone and has the same priority. The EHPLMN is mainly used in conjunction with mobile phones to solve "periodic network search of terminals, roaming signs appears, and faster power consumption" and other issues caused by single network-dual-number or even single network-multi-number.

In some implementations, the network ID of the PLMN described herein can include network number segments. For example, China Mobile includes four number segments, that is, 46000, 46002, 46007, and 46008; China Unicom includes three number segments, that is, 46001, 46006, 46009 and the like and there is no limit. Specifically, when the network types supported by the mobile phone have been determined, the mobile phone can add network IDs of the PLMNs of the network types to the EHPLMN list. For example, if the SIM card of the mobile phone is a SIM card of China Mobile, it can be determined that the network supported by the mobile phone is a network of China Mobile, and therefore, network number segments of the network of China Mobile can be added to the EHPLMN list.

Operations of block 101~block 103 can be repeated for multiple times according to actual needs and/or application scenarios.

At block 104, if a target PLMN that matches at least one network ID of the EHPLMN list is found during a network search, the mobile terminal can establish a communication connection between the mobile terminal and the target PLMN. In one implementation, when the mobile terminal arrives at a new visited place, the mobile terminal can start the network search.

In some implementations, when a mobile phone arrives at a visited place from the home of the SIM card thereof or arrives at a new visited place from a visited place that has already established a network connection and starts a network search, the mobile phone can acquire the network ID of a PLMN broadcasted by a base station. After obtains the network ID of the PLMN of the visited place via base station broadcast, the mobile phone can match the network ID of the PLMN obtained via scan with network IDs of PLMNs in the EHPLMN list. When a PLMN (that is, the target PLMN) that matches at least one network ID of the EHPLMN list is searched (in other words, found), the mobile phone can establish a communication connection with the target PLMN. That is, the mobile phone can first match the network ID of the searched PLMN with network IDs pre-stored in the EHPLMN list, and a network connection can be established after a successful match, there is no need to attempt communication connection for each searched PLMN as in the related art. Briefly, in the network access method of the implementation of the present disclosure, match before attempting a network connection, and it is possible to reduce wasted effort and improve the efficiency of network connection.

As can be seen from the implementations described above, a mobile phone can acquire pre-stored information of SIM cards from a storage space and based on the SIM card information acquired, the mobile phone can determine whether the SIM card currently inserted into the mobile phone is a new card, determine all network types supported by the SIM card, and determine, based on the above mentioned network type, the network ID of the PLMN of the network type supported by the SIM card. Besides, the mobile phone can add the network ID of the PLMN of the network type into the EHPLMN list and conduct network ID match according to the EHPLMN list. Network connection will be conducted after a successful match and there is no need to attempt network connection for each searched network, and it is therefore possible to improve the efficiency of network search. When the mobile phone arrives at a visited place from a designated location and starts a network search, the mobile phone can match the searched network ID with network IDs stored in the EHPLMN list. If a target PLMN that matches at least one network ID in the EHPLMN list is searched, a communication connection between the mobile phone and the target PLMN can be established, in this way, it is possible to reduce the length of time that the mobile phone takes to connect to the PLMN and enhance user communication experience on the mobile phone.

Figure 2:
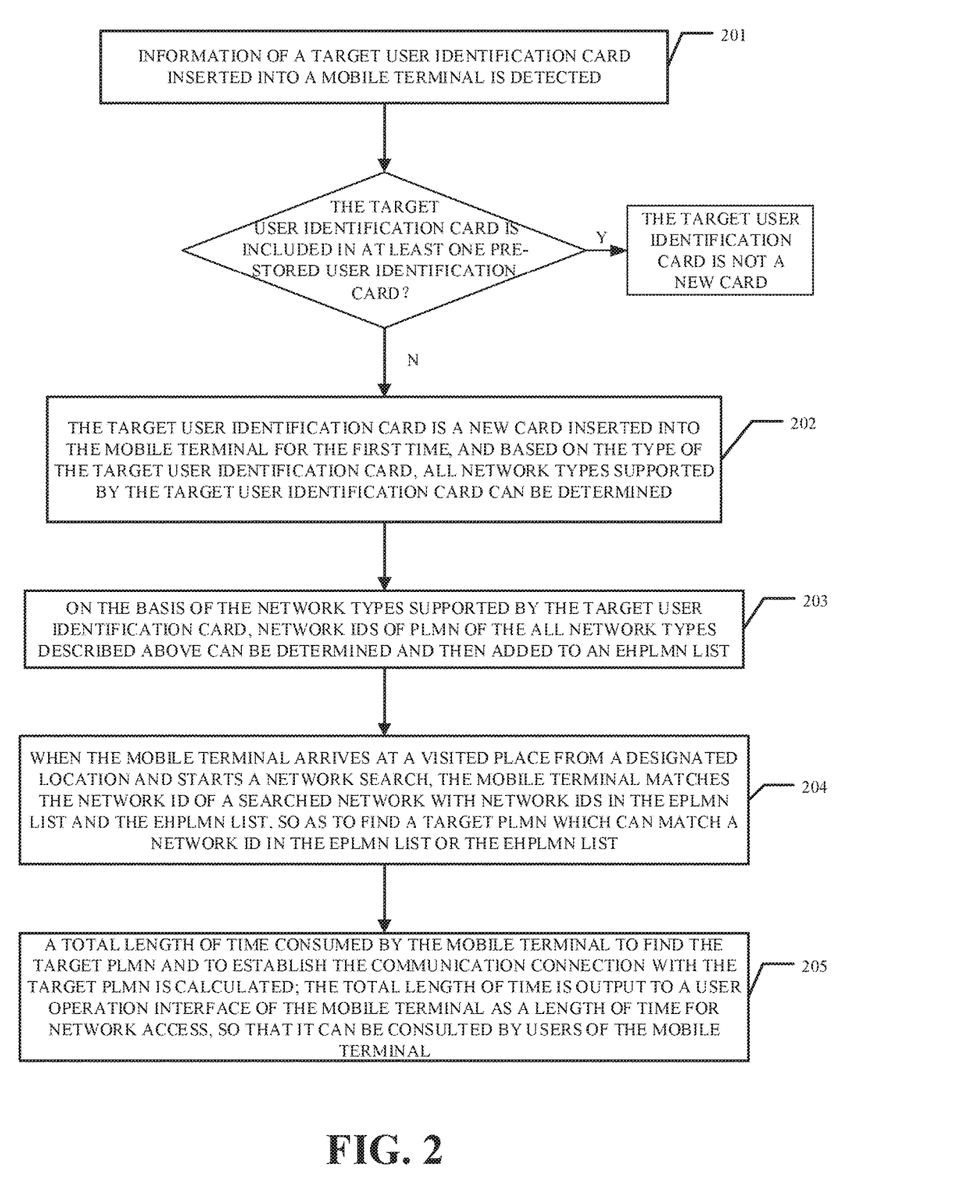
FIG. 2 is a flow diagram illustrating another network access method of an implementation of the present disclosure.

Please referring to FIG. 2, which is a flow diagram illustrating another network access method according to an implementation of the present disclosure. As illustrated in FIG. 2, the network access method can begin at block 201.

At block 201, information of a target user identification card inserted into a mobile terminal is detected, and whether or not the target user identification card is included in at least one user identification card pre-stored by the mobile terminal is judged.

During implementation, implementation of the process of determining whether a target SIM card inserted into a mobile phone is a new card can refer to the description of block 101 of the first implementation, and it will not be repeated here.

At block 202, if the target user identification card is not included in the at least one user identification card pre-stored by the mobile terminal, it can be determined that the target user identification card is a new card inserted into the mobile terminal for the first time, and based on the type of the target user identification card, all network types supported by the target user identification card can be determined.

During implementation, implementation of the process of determining all network types supported by the target SIM card can refer to the description of block 102 of the first implementation, and it will not be repeated here.

At block 203, on the basis of the network types supported by the target user identification card, network IDs of public land mobile networks (PLMN) of all the network types described above can be determined and then added to an equivalent home public land mobile network (EHPLMN) list.

During implementation, implementation of the process of adding the network IDs of the PLMNs of all network types supported by a target SIM card to an EHPLMN list can refer to the description of block 103 of the first implementation, and it will not be repeated here.

Further, in some implementations, after determining network IDs of the PLMN of all network types supported by the target SIM card, the mobile phone can add network IDs of the PLMNs of all network types supported by the mobile phone to an EPLMN list; in this way, when the mobile phone arrives at a visited place and starts a network search, by searching networks via the EPLMN list, it is possible to increase the diversity of network search and increase the fun of network search.

At block 204, when the mobile terminal arrives at a visited place from a designated location and starts a network search, the mobile terminal matches the network ID of a searched network with network IDs in the EPLMN list and the EHPLMN list, so as to find a target PLMN which can match at least one network ID in the EPLMN list or the EHPLMN list.

During implementation, implementation of the process of matching the network ID of the searched network with network IDs in the EHPLMN list so as to find a target PLMN that matches at least one network ID in the EHPLMN list can refer to the description of block 104 of the first implementation, and it will not be repeated here.

Further, when a mobile phone arrives at a visited place and starts a network search, the mobile phone can match the network ID of the searched network with network IDs in the EPLMN list and the EHPLMN list simultaneously, so as to find a target PLMN that matches at least one network ID in the EPLMN list or the EHPLMN list. During implementation, since the way in which information is stored in different lists (the EPLMN list and the EHPLMN list) may be different and search strategies defined by different lists are not the same, the search speed that the mobile phone to search, from different lists (the EPLMN list and the EHPLMN list), a matched network ID of the network ID of the searched PLMN varies depending on the network IDs of PLMNs; for example, if the network ID that matches the network ID of the searched PLMN is different in storage location, the match speed between the network ID of the PLMN and network IDs in the lists may varies. According to the implementation of the present disclosure, by simultaneously matching the network ID of the searched PLMN with the EHPLMN list and the EPLMN list respectively, it is possible to improve the match efficiency of the network ID of the PLMN, shorten the match time of the network ID, and improve the efficiency of network search.

By matching the network ID of the searched PLMN with the EHPLMN list and the EPLMN list respectively, the mobile phone can obtain a network ID that matches the network ID of the PLMN; after a target PLMN that matches at least one network ID stored in the EHPLMN list or the EPLMN list is searched, a communication connection between the mobile phone and the target PLMN can be established.

At block 205, a total length of time consumed by the mobile terminal to find the target PLMN and establish the communication connection with the target PLMN is calculated; the total length of time is output to a user operation interface of the mobile terminal as a length of time for network access (in other words, the length of time for current network access) for consulting by users of the mobile terminal.

In some implementations, after the communication connection with the target PLMN is established, the mobile phone can calculate a total length of time consumed by the mobile phone to find the target PLMN and establish the communication connection with the target PLMN, and further output the total length of time to a user operation interface of the mobile terminal as a length of time for current network access for consulting by users of the mobile phone. The user operation interface of the mobile phone can be a mobile phone display such as a touch screen; however, the present disclosure is not limited thereto. After viewing the length of time for network access via the mobile phone display, users of the mobile phone can determine whether to feed back the length of time for network access, the visited place, and other information to the operator management platform of the SIM card of the mobile phone. If the mobile phone chooses to feed back the length of time for network access, the visited place, and other information to the operator management platform of the SIM card of the mobile phone, optimal management of network access time can be performed via the operator management platform of the SIM card of the mobile phone. Through optimization, the efficiency of mobile access of the mobile phone can be improved continuously, and user experience of the mobile phone can be enhanced.

According to implementations of the present disclosure, a mobile phone can first determine whether a target user identification card inserted thereto is a new card, and if YES, the mobile phone can determine network types supported by itself according to the target user identification card and determine, based on the network types supported by the target user identification card, network IDs of PLMNs of the above-mentioned network types; thereafter, network IDs of PLMNs of the above-mentioned network types can be added into an EHPLMN list and an EPLMN list so as to conduct network ID match according to the EHPLMN list and the EPLMN list. Network connection can be performed after a successful match; since there is no need to attempt network connection with regard to each searched network, efficiency of network search can be improved. When the mobile phone arrives at a visited place from a designated location and starts a network search, the mobile phone can match the searched network ID with network IDs stored in the EHPLMN list and the EPLMN list. If a target PLMN that matches at least one network ID in the EHPLMN list or the EPLMN list is searched, a communication connection with the target PLMN is established; it is possible to reduce the length of time that the new user identification card of the mobile phone takes to connect to the PLMN and improve user communication experience of the mobile phone. According to implementations of the present disclosure, the length of time for network access can be fed back to an operator management platform of the SIM card of the mobile phone, and optimal management of network access time can be performed via the operator management platform of the SIM card. Through optimization, the efficiency of mobile access of the mobile phone can be improved continuously, and user experience of the mobile phone can be enhanced.

Figure 3:
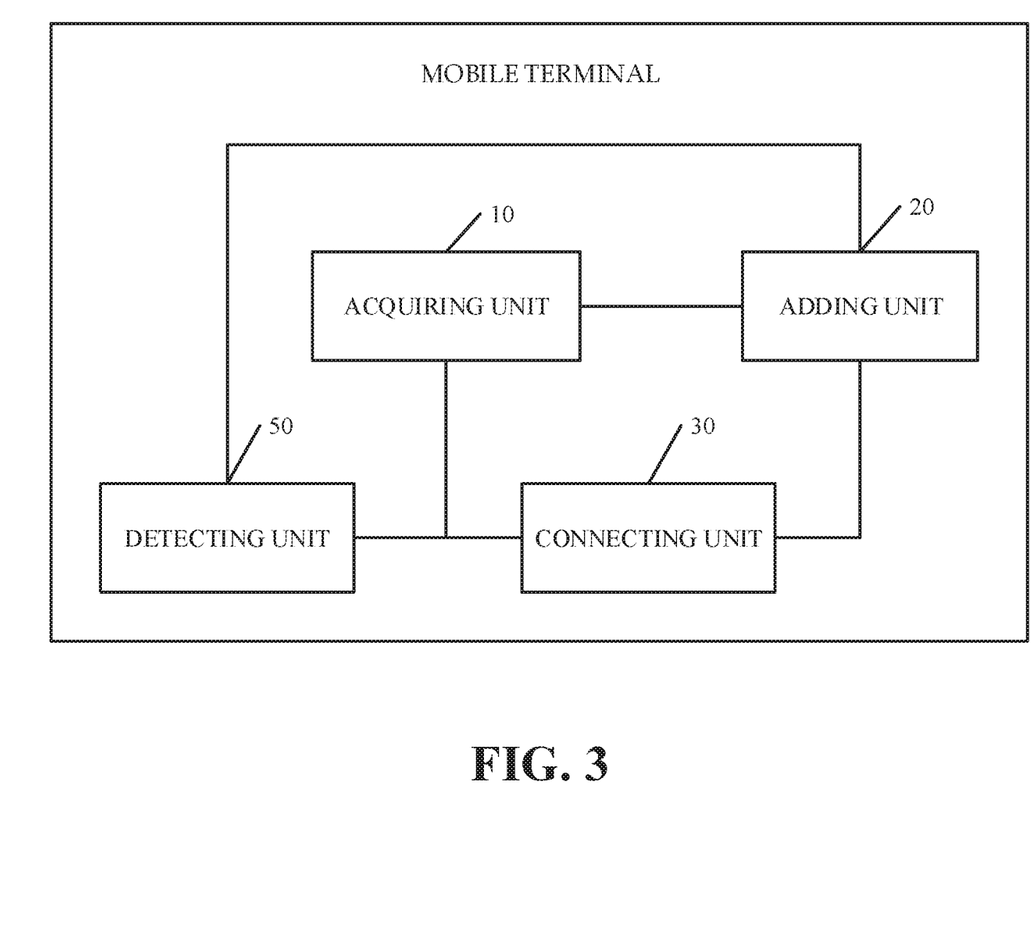
FIG. 3 is a structure diagram illustrating a mobile terminal of an implementation of the present disclosure.

Please referring to FIG. 3, which is a structure diagram illustrating a mobile terminal of an implementation of the present disclosure. The mobile terminal is used to perform the network access method of the implementations of the present disclosure. As illustrated in FIG. 3, the mobile terminal includes a detecting unit 50 (such as a detector), an acquiring unit 10 (such as a processor, also referred to as a determining unit in the above-mentioned description), an adding unit 20 (such as a processor), and a connecting unit 30 (such as a communicator or connector and the like). As an implementation, referring to FIG. 5, the mobile terminal can further include a hardware processor configured to perform the elements described above and other elements described below. The hardware processor can be connected to a memory via a BUS, and invoke programs stored in the memory to perform the elements of the mobile terminal of the present disclosure.

The detecting unit 50 is configured to detect information of a target user identification card inserted into the mobile terminal, so as to determine whether the target user identification card is a new card that inserted into the mobile terminal for the first time; for example, the detecting unit 50 determine whether the target user identification card is included in at least one user identification card pre-stored by the mobile terminal.

The acquiring unit 10 is configured to acquire or determine, on the basis of the type of the target user identification card, all network types supported by the target user identification card. The acquiring unit 10 is further configured to acquire or determine, on the basis of the network types supported by the target user identification card, network IDs of PLMNs of all the network types.

The adding unit 20 is configured to add the network IDs of the PLMNs of all the network types supported by the mobile phone acquired by the acquiring unit 10 to an equivalent home public land mobile network (EHPLMN) list. Further, in some implementations, the adding unit 20 can add network IDs of the PLMN of all network types to an EPLMN list; in this way, when the mobile phone arrives at a visited place and starts a network search, by searching networks via the EPLMN list and/or the EHPLMN list, it is possible to increase the diversity of network search and improve the efficiency of network search.

The connecting unit 30 is configured to establish a communication connection between the mobile terminal and a target PLMN that matches at least one network ID in the EHPLMN list if the target PLMN is found during a network search. For example, when the mobile terminal arrives at a visited place from a designated location, the mobile terminal can start the network search.

In some implementations, the detecting unit 50 is configured to: acquire information of the at least one user identification card pre-stored by the mobile terminal from a build-in storage space of the mobile terminal or a cloud storage space; judge whether the information of the target user identification card belongs to the information of the at least one user identification card pre-stored in the build-in storage space of the mobile terminal or the cloud storage space; and if YES, determine that the target user identification card is included in the at least one user identification card pre-stored by the mobile terminal; otherwise, determine that the target user identification card is not included in the at least one user identification card pre-stored by the mobile terminal.

The user identification card can be a subscriber identity module (SIM) card, and the information of the user identification card includes at least one of: the operator of the SIM card, network types supported by the SIM card, and the subscriber of the SIM card.

In some implementations, the adding unit 20 is further configured to add the network IDs of the PLMNs of all the network types to an equivalent public land mobile network (EPLMN) list, so that networks can be found by the mobile terminal.

The network ID can include a network number segment.

Figure 4:
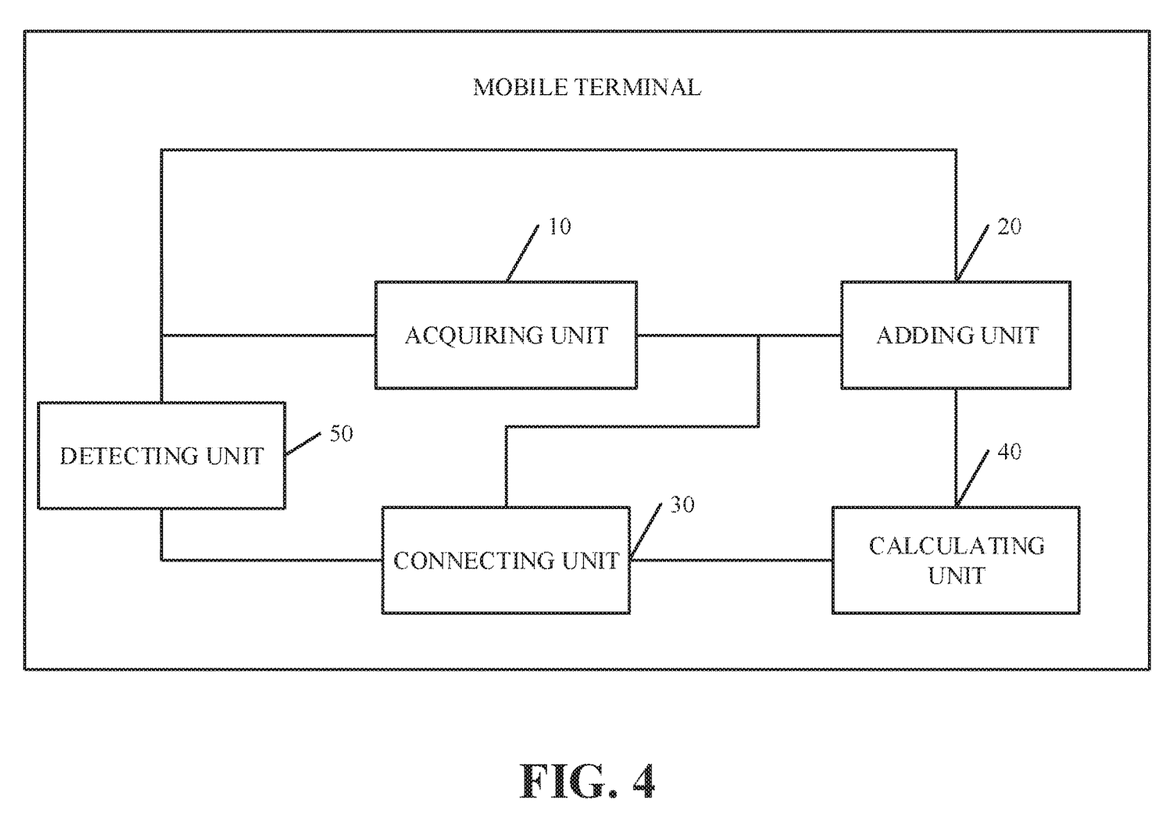
FIG. 4 is a structure diagram illustrating another mobile terminal of an implementation of the present disclosure.

In some implementations, as illustrated in FIG. 4, the mobile terminal according to implementations of the present disclosure can further include a calculating unit 40, which is configured to calculate a total length of time consumed by the mobile terminal to find the target PLMN and establish the communication connection with the target PLMN, and output the total length of time to a user operation interface of the mobile terminal as a length of time for current network access for consulting by users of the mobile terminal.

In some implementations, the mobile phone identification card described herein can be a SIM card of a mobile phone. The information of the user identification card can include: the operator of the SIM card (For example, China Mobile, China Unicom, or China Telecom), network types supported by the SIM card, or the subscriber of the SIM card (that is, the user ID of the mobile phone user bonded with the SIM card).

During implementation, when the mobile phone user inserts a mobile phone SIM card into the card slot of the mobile phone, the detecting unit 50 can first detect whether the SIM card (that is, target user identification card, or target SIM card) inserted into the card slot of the mobile phone is a new card. Specifically, the detecting unit 50 can detect the information of the target SIM card inserted into the mobile phone via a built-in card identification module, and match the information of the target SIM card with information of multiple SIM cards pre-stored by the mobile terminal so as to determine whether the target SIM card is one of the multiple SIM cards pre-stored by the mobile terminal. If the detecting unit 50 judges that the target SIM card is one of the multiple SIM cards pre-stored by the mobile phone, the detecting unit 50 can further determine that the target SIM card is a card that has been used on the mobile phone, that is, the target SIM card is not a new card. If the detecting unit 50 judges that the target SIM card is not one of the multiple SIM cards pre-stored by the mobile phone, the detecting unit 50 can further determine that the target SIM card has not been used on the mobile phone and is a new card.

During implementation, the detecting unit 50 can first obtains information of one or more SIM cards pre-stored by the mobile phone from a built-in storage space (including a mobile phone build-in memory or an expanded storage space such as a SD card of the mobile phone, and the like) or a cloud storage space of the mobile phone, where the one or more SIM cards are SIM cards that have been used on the mobile phone, and the detecting unit 50 can store information of each SIM card that has been used in the above mentioned storage space. After the pre-stored information of the one or more SIM cards has been obtained, the detecting unit 50 can match information of the target SIM card with the pre-stored information of the multiple SIM cards so as to judge whether the information of the target SIM card is one of the pre-stored information of the multiple SIM cards of the mobile phone.

In some implementations, if the detecting unit 50 judges that the information of the target SIM card is not one of the pre-stored information of the multiple SIM cards, the detecting unit 50 can further determine that the target SIM card is a new card, and prompt information that the target SIM card is a new card can be output to a user operation interface of the mobile phone such that users of the mobile phone can consult and determine whether the detection result is accurate. During implementation, if the detection result is accurate, the acquiring unit 10 can acquire or determine all network types supported by the mobile terminal according to the type of the target SIM card, and can further establish a network search list corresponding to the target SIM card.

During implementation, the acquiring unit 10 can determine network types supported by a mobile phone SIM card ("mobile phone" for short) according to the information of the SIM card, and can establish a corresponding EHPLMN list based on the network types supported by the mobile phone.

In some implementations, the network type described herein can include: CDMA 1×, 800 MHZ frequency band assigned for mobile terminals in CDMA network standard; 900/1800/1900 MHZ frequency band assigned for mobile terminals in GSM network standard, and 900/1800 MHZ frequency band assigned for GSM 1× dual-model (that is, WCDMA) in recent years; 900/1800/1900/2100 MHz frequency band assigned for terminals in 3G mobile communication technology network standard; and 1920-2170 MHZ frequency band assigned for terminals in 4G mobile communication technology network standard; however, the present disclosure is not limited thereto.

In some implementations, after the acquiring unit 10 determines all network types supported by the SIM card of the mobile terminal, based on all the network types, the acquiring unit 10 can further acquire or determine network IDs of PLMNs of all the network types and add the network IDs of PLMNs of all the network types to the EHPLMN list. That is, in implementations of the present disclosure, the acquiring unit 10 can acquire or determine network IDs of PLMNs of multiple network types supported by the mobile phone in advance, and the adding unit 20 can add the network IDs of PLMNs of the multiple network types to the EHPLMN list as well as save the EHPLMN list to a storage space. The EHPLMN list can be used for network ID match when the mobile phone searches networks and the mobile phone can attempt to connect to a network after a corresponding network ID has been found; it is possible to reduce the length of time consumed for network search and improve the efficiency of network connection.

In some implementations, the EHPLMN described herein is an equivalent PLMN of a PLMN currently selected by the mobile phone and has the same priority. The EHPLMN is mainly used in conjunction with mobile phones to solve "periodic network search of terminals, roaming signs appears, and faster power consumption" and other issues caused by single network-dual-number or even single network-multi-number.

In some implementations, the network IDs of the PLMN described herein can include network number segments. For example, China Mobile includes four number segments, that is, 46000, 46002, 46007, and 46008; China Unicom includes three number segments, that is, 46001, 46006, 46009 and the like and there is no limit. Specifically, when the network type supported by the mobile phone has been determined, the mobile phone can add network IDs of the PLMN of the network type to the EHPLMN list. For example, if the SIM card of the mobile phone is a SIM card of China Mobile, it can be determined that the network supported by the mobile phone is a network of China Mobile, and therefore, network number segments of the network of China Mobile can be added to the EHPLMN list.

Figure 5:
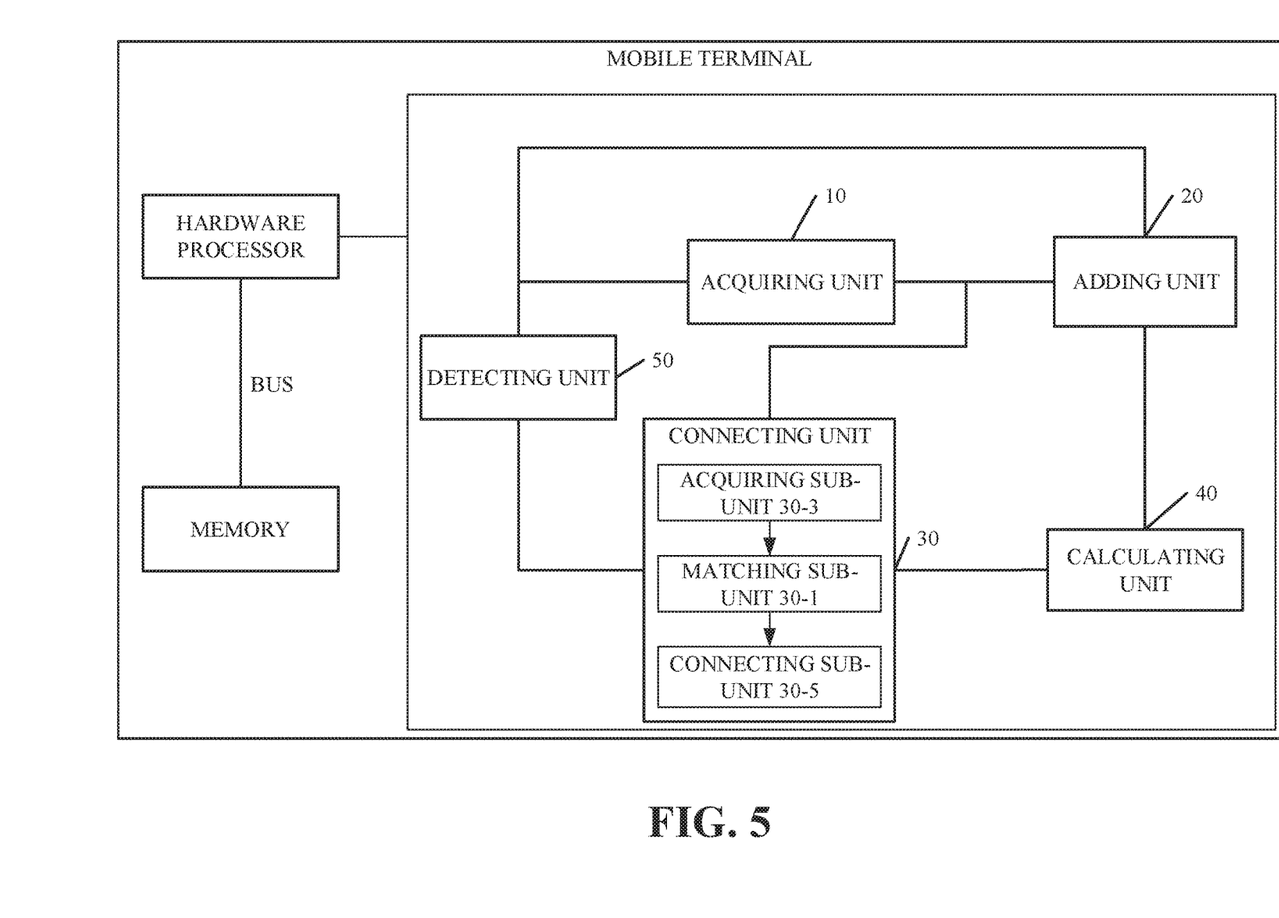
FIG. 5 is a structure diagram illustrating another mobile terminal of an implementation of the present disclosure.

As illustrated in FIG. 5, in some implementations, the connecting unit 30 further comprise a matching sub-unit 30-1, which is configured to match the network ID of the searched network with network IDs in the EHPLMN list, so as to find a target PLMN that matches at least one network ID in the EHPLMN list; or configured to match the network ID of the searched network with network IDs in the EHPLMN list and the EPLMN list simultaneously, so as to find the target PLMN that matches at least one network ID in the EPLMN list or at least one network ID in the EHPLMN list.

In some implementations, the connecting unit 30 can further include an acquiring sub-unit 30-3 and a connecting sub-unit 30-5 as illustrated in FIG. 5. When a mobile phone arrives at a visited place from the home of the SIM card thereof or arrives at a new visited place from a visited place that has already established a network connection and starts a network search, the acquiring sub-unit 30-3 can acquire the network ID of a PLMN broadcasted by a base station. After the acquiring sub-unit 30-3 obtains the network ID of the PLMN of the visited place via base station broadcast, the matching sub-unit 30-1 can match the network ID of the PLMN obtained via scan with network IDs of PLMNs in the EHPLMN list. When a PLMN (that is, the target PLMN) that matches at least one network ID of the EHPLMN list is searched, the connecting sub-unit 30-5 can establish a communication connection with the target PLMN. That is, the connecting unit 30 can first match, via the matching sub-unit 30-1, the network ID of the searched PLMN obtained by the acquiring sub-unit 30-3 with network IDs pre-stored in the EHPLMN list, and establish a network connection after a successful match via the connecting sub-unit 30-5, there is no need to attempt communication connection for the network ID of each searched PLMN, and it is possible to reduce wasted effort and improve the efficiency of network connection.

Further, when a mobile phone arrives at a visited place and starts a network search, the connecting unit 30 can match the network ID of the searched network with network IDs in the EPLMN list and the EHPLMN list simultaneously via the matching sub-unit 30-1, so as to find a target PLMN that matches at least one network ID in the EPLMN list or the EHPLMN list. During implementation, since the way in which information is stored in different lists (the EPLMN list and the EHPLMN list) may be different and search strategies defined by different lists are not the same, the search speed that the mobile phone to search, from different lists (the EPLMN list and the EHPLMN list), a matched network ID of the network ID of the searched PLMN varies depending on the network IDs of PLMNs; for example, if the network ID that matches the network ID of the searched PLMN is different in storage location, the match speed between the network ID of the PLMN and network IDs in the lists may varies. According to the implementation of the present disclosure, by simultaneously matching the network ID of the searched PLMN with the EHPLMN list and the EPLMN list respectively, it is possible to improve the match efficiency of the network ID of the PLMN, shorten the match time of the network ID, and improve the efficiency of network search.

During implementation, the connecting unit 30 can match the network ID of the searched PLMN with the EHPLMN list and the EPLMN list respectively and then obtain a network ID that matches the network ID of the PLMN via the matching sub-unit 30-1; after a target PLMN that matches at least one network ID stored in the EHPLMN list or the EPLMN list is searched, the connecting unit 30 can establish a communication connection between the mobile phone and the target PLMN via the connecting sub-unit 30-5 for example.

In some implementations, after the connecting unit 30 establishes the communication connection with the target PLMN, the calculating unit 40 can calculate a total length of time consumed by the mobile phone to find the target PLMN and establish the communication connection with the target PLMN, and further output the total length of time to a user operation interface of the mobile terminal as a length of time for current network access for consulting by users of the mobile phone. The user operation interface of the mobile phone can be a mobile phone display such as a touch screen; however, the present disclosure is not limited thereto. After viewing the length of time for network access via the mobile phone display, users of the mobile phone can determine whether to feed back the length of time for network access, the visited place, and other information to the operator management platform of the SIM card of the mobile phone. If the mobile phone chooses to feed back the length of time for network access, the visited place, and other information to the operator management platform of the SIM card of the mobile phone via the calculating unit 40, optimal management of network access time can be performed via the operator management platform of the SIM card of the mobile phone. Through optimization, the efficiency of mobile access of the mobile phone can be improved continuously, and user experience of the mobile phone can be enhanced.

According to implementations of the present disclosure, a mobile phone can first determine whether a target user identification card inserted thereto is a new card, and if YES, the mobile phone can determine network types supported by itself according to the target user identification card and determine, based on the network types supported by the target user identification card, network IDs of PLMNs of the above-mentioned network types; thereafter, network IDs of PLMNs of the above-mentioned network types can be added into an EHPLMN list and an EPLMN list so as to conduct network ID match according to the EHPLMN list and the EPLMN list. Network connection can be performed after a successful match; since there is no need to attempt network connection with regard to each searched network, efficiency of network search can be improved. When the mobile phone arrives at a visited place from a designated location and starts a network search, the mobile phone can match the searched network ID with network IDs stored in the EHPLMN list and the EPLMN list. If a target PLMN that matches at least one network ID in the EHPLMN list or the EPLMN list is searched, a communication connection with the target PLMN is established; it is possible to reduce the length of time that the new user identification card of the mobile phone takes to connect to the PLMN and improve user communication experience of the mobile phone. According to implementations of the present disclosure, the length of time for network access can be fed back to an operator management platform of the SIM card of the mobile phone, and optimal management of network access time can be performed via the operator management platform of the SIM card. Through optimization, the efficiency of mobile access of the mobile phone can be improved continuously, and user experience of the mobile phone can be enhanced.

Modules or sub-modules in all implementations of the present disclosure can be implemented by a general purpose integrated circuit such as a CPU (Central Processing Unit), or by an ASIC (Application Specific Integrated Circuit).

The steps in the method of the implementation of the present disclosure can be sequentially adjusted, merged, and subtracted according to actual needs.

The units in the terminal of the implementation of the present disclosure can be combined, divided, and deleted according to actual needs.

It will be understood by those of ordinary skill in the art that, implementation of all or part of the processes in the method of the implementations described above can be accomplished by a computer program to instruct the associated hardware; the computer program can be stored in a computer-readable storage medium and which, when executed, may include flows of respective methods of the implementations as described above. The storage medium can be a magnetic disk, an optical disk, a read-only memory (ROM), a random access memory (RAM), or the like.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. A method of accessing a network, comprising:
   detecting information of a target user identification card inserted into a mobile terminal, and determining whether the target user identification card is included in at least one user identification card stored in advance by the mobile terminal; wherein the detecting and the determining comprises:
   acquiring from a built-in storage space or a cloud storage space of the mobile terminal the information of the at least one user identification card stored in advance by the mobile terminal;
   determining whether the information of the target user identification card is that of one of the at least one user identification card pre-stored in the built-in storage space and the cloud storage space of the mobile terminal;

when the information of the target user identification card is that of one of the at least one user identification card pre-stored in the built-in storage space and the cloud storage space of the mobile terminal, determining that the target user identification card is included in the at least one user identification card pre-stored by the mobile terminal; and when the information of the target user identification card is not that of one of the at least one user identification card pre-stored in the built-in storage space and the cloud storage space of the mobile terminal, determining that the target user identification card is not included in the at least one user identification card pre-stored by the mobile terminal;

wherein the user identification card is a subscriber identity module (SIM) card, and the information of the user identification card comprises at least one selected from the group consisting of an operator of the SIM card, a network type supported by the SIM card, and a user of the SIM card;

when the target user identification card is not included in the at least one user identification card stored in advance by the mobile terminal, determining that the target user identification card is a new card inserted into the mobile terminal for the first time, and determining all the network types supported by the target user identification card according to a type of the target user identification card;

determining network identifiers of public land mobile networks (PLMNs) of all the network types, according to the network types supported by the target user identification card, and adding the network identifiers of the PLMNs of all the network types to an equivalent home public land mobile network (EHPLMN) list; and when a target PLMN is found to match a network identifier in the EHPLMN list when the mobile terminal arrives at a place of visit from a designated location and begins to search for networks, establishing a communication connection between the mobile terminal and the target PLMN.

2. The method of claim 1, further comprising, after adding the network identifiers of the PLMNs of all the network types to the EHPLMN:

adding the network identifiers of the PLMNs of all the network types to an equivalent public land mobile network (EPLMN) list for the mobile terminal to search for the networks, wherein each of the network identifiers comprises a network number segment.

3. The method of claim 2, further comprising, when the mobile terminal arrives at the place of visit from the designated location and begins to search for the networks:

matching, by the mobile terminal, the network identifiers of the searched networks with those in the EHPLMN list, in order to search for a target PLMN that matches a network identifier in the EHPLMN list; or matching, by the mobile terminal, the network identifiers of the searched networks with those in the EPLMN list and in the EHPLMN list, in order to search for a target PLMN that matches a network identifier in the EPLMN list or in the EHPLMN list.

4. The method of claim 3, further comprising, after establishing the communication connection between the mobile terminal and the target PLMN:

calculating a total length of time consumed by the mobile terminal to find the target PLMN and establish the communication connection with the target PLMN, and outputting the total length of time as the time of the current network access to a user interface of the mobile terminal for view of the user of the mobile terminal.

5. The method of claim 1, further comprising, after adding the network identifiers of the PLMNs of all the network types to the EHPLMN:

adding the network identifiers of the PLMNs of all the network types to an equivalent public land mobile network (EPLMN) list for the mobile terminal to search for the networks;

wherein each of the network identifiers comprises a network number segment.

6. The method of claim 5, further comprising, when the mobile terminal arrives at the place of visit from the designated location and begins to search for the networks:

matching, by the mobile terminal, the network identifiers of the searched networks with those in the EHPLMN list, in order to search for a target PLMN that matches a network identifier in the EHPLMN list; or matching, by the mobile terminal, the network identifiers of the searched networks with those in the EPLMN list and in the EHPLMN list, in order to search for a target PLMN that matches a network identifier in the EPLMN list or in the EHPLMN list.

7. The method of claim 6, further comprising, after establishing the communication connection between the mobile terminal and the target PLMN:

calculating a total length of time consumed by the mobile terminal to find the target PLMN and establish the communication connection with the target PLMN, and outputting the total length of time as the time of the current network access to a user interface of the mobile terminal for view of the user of the mobile terminal.

8. A mobile terminal, comprising:

a memory configured to store program codes; and at least one processor configured to execute the program codes stored in the memory to:

detect information of a target user identification card inserted into a mobile terminal, and determine whether the target user identification card is included in at least one user identification card stored in advance by the mobile terminal, wherein the program codes stored in the memory are configured to:

acquire from a built-in storage space or a cloud storage space of the mobile terminal the information of at the least one user identification card stored in advance by the mobile terminal;

determine whether the information of the target user identification card is that of one of the at least one user identification card pre-stored in the built-in storage space and the cloud storage space of the mobile terminal;

when the information of the target user identification card is that of one of the at least one user identification card pre-stored in the built-in storage space and the cloud storage space of the mobile terminal, determine that the target user identification card is included in the at least one user identification card pre-stored by the mobile terminal; and when the information of the target user identification card is not that of the at least one user identification card pre-stored in the built-in storage space and the cloud storage space of the mobile terminal, determine that the target user identification card is not included in the at least one user identification card pre-stored by the mobile terminal;

wherein the user identification card is a subscriber identity module (SIM) card, and the information of the user identification card comprises at least one selected from the group consisting of an operator of the SIM card, a network type supported by the SIM card, and a user of the SIM card;

determine that the target user identification card is a new card inserted into the mobile terminal for the first time when determining that the target user identification card is not included in the at least one user identification card stored in advance by the mobile terminal, and determine all the network types supported by the target user identification card according to a type of the target user identification card;

determine network identifiers of public land mobile networks (PLMNs) of all the network types according to the network types supported by the target user identification card, and add the network identifiers of the PLMNs of all the network types to an equivalent home public land mobile network (EHPLMN) list; and when a target PLMN is found to match a network identifier in the EHPLMN list when the mobile terminal arrives at a place of visit from a designated location and begins to search for networks, establish a communication connection between the mobile terminal and the PLMN.

9. The mobile terminal of claim 8, wherein the program codes stored in the memory are further configured to:

add the network identifiers of the PLMN of the network types to an equivalent public land mobile network EPLMN list for the mobile terminal to search for networks;

wherein each of the network identifiers comprises a network number segment.

10. The mobile terminal of claim 9, wherein the program codes stored in the memory are configured to:

match the network identifiers of the searched networks with those in the EHPLMN list, in order to search for a target PLMN that matches a network identifier in the EHPLMN list; or match the network identifiers of the searched networks with those in the EPLMN list and in the EHPLMN list, in order to search for a target PLMN that matches a network identifier in the EPLMN list or the EHPLMN list.

11. The mobile terminal of claim 10, wherein the program codes stored in the memory are further configured to calculate a total length of time consumed to find the target PLMN and establish the communication connection with the target PLMN, and output the total length of time as the time of the current network access to a user interface of the mobile terminal for view of the user of the mobile terminal.

12. The mobile terminal of claim 8, wherein the program codes stored in the memory are further configured to:

add the network identifiers of the PLMN of all the network types to an equivalent public land mobile network (EPLMN) list for the mobile terminal to search for networks;

wherein each of the network identifiers comprises a network number segment.

13. The mobile terminal of claim 12, wherein the program codes stored in the memory are configured to:

match the network identifiers of the searched networks with those in the EHPLMN list, in order to search for a target PLMN that matches a network identifier in the EHPLMN list; or match the network identifiers of the searched networks with those in the EPLMN list and in the EHPLMN list, in order to search for a target PLMN that matches a network identifier in the EPLMN list or the EHPLMN list.

14. The mobile terminal of claim 13, wherein the program codes stored in the memory are further configured to calculate a total length of time consumed to find the target PLMN and establish the communication connection with the target PLMN, and output the total length of time as the time of the current network access to a user interface of the mobile terminal for view of the user of the mobile terminal.

* * * * *